Oct. 11, 1949.  M. H. SWEET  2,484,322
PHOTOGRAPHIC SENSITOMETER HAVING AN
OPTICAL WEDGE ON A ROTATING DRUM
Filed Sept. 14, 1944  3 Sheets-Sheet 1

INVENTOR.
Monroe H. Sweet
BY
ATTORNEYS

Oct. 11, 1949.  M. H. SWEET  2,484,322
PHOTOGRAPHIC SENSITOMETER HAVING AN
OPTICAL WEDGE ON A ROTATING DRUM
Filed Sept. 14, 1944  3 Sheets-Sheet 2

INVENTOR.
Monroe H. Sweet.
BY
ATTORNEYS.

Oct. 11, 1949.                    M. H. SWEET                    2,484,322
                    PHOTOGRAPHIC SENSITOMETER HAVING AN
                    OPTICAL WEDGE ON A ROTATING DRUM
Filed Sept. 14, 1944                                    3 Sheets-Sheet 3

INVENTOR.
Monroe H. Sweet.
BY
ATTORNEYS.

Patented Oct. 11, 1949

2,484,322

UNITED STATES PATENT OFFICE 2,484,322

PHOTOGRAPHIC SENSITOMETER HAVING AN OPTICAL WEDGE ON A ROTATING DRUM

Monroe Hamilton Sweet, Binghamton, N. Y., assignor to General Aniline & Film Corporation, New York, N. Y., a corporation of Delaware Application September 14, 1944, Serial No. 553,993

8 Claims. (Cl. 95—10)

1

This invention pertains to photographic sensitometers, more especially, to sensitometers of the intensity scale type which are adapted to operate non-intermittently. The art of sensitometry has been developed to a relatively high degree, and in that development, two types of instrument have evolved. The intensity scale instruments and time scale instruments are at this time both well known, but in actual practice, time scale sensitometers are relatively common while the intensity scale instruments are generally limited to experimental types and are not available commercially.

For most practical uses, the intensity scale instruments would naturally be preferred. For theoretical and practical reasons, they give results based on use of the material in practice and which should represent a truer picture of the capabilities or limitations of any photographic material than could be obtained by use of time scale instruments. Photography as a practical art is generally practiced under widely varying light intensities. The behavior of photographic materials under varying light conditions can best be ascertained with an intensity type instrument.

The invention has been made with the purpose in mind of providing an intensity scale instrument, which is relatively compact, simple, inexpensive, and easily manufactured commercially. The instrument is also adapted to be used by those of ordinary skill, and with results obtained accurate enough for most purposes.

Among other objects of the invention are the production of a sensitometer which is adapted to employ a light source of low wattage thereby eliminating cooling problems and also reducing problems of stabilization. Control for the intensity of illumination is also provided; the light source may be treated as a point, the distance from which to the strip being exposed is easily measured. Changes in intensity may be effected by movement of the light source along a graduated scale and the inverse square law of photometric attenuation may be applied.

The light source is also directed and so positioned with respect to the strip being exposed that there is no possibility of a lateral "light pattern" such as frequently exists in other types of sensitometers.

It is also an object of the invention to provide an instrument which shall be capable of producing strips exposed in accordance with an intensity scale modulation in one direction and with a time scale in the other. A further object of the invention is to produce an intensity scale

2 sensitometer in which the strip is moved at a uniform rate and to simplify the control of the instrument so that as the strip is started in its travel past the point of exposure, the light source shall be so controlled as to allow the light rays to fall upon the strip just as it approaches that point and then to close the shutter or otherwise discontinue the exposure as the strip passes that point. In other words, the exposure is so synchronized with the travel of the strip that it commences at an appropriate point and is discontinued before there can be any re-exposure of any part of the strip. Other objects of the invention will be apparent as the disclosure proceeds.

The invention is herein illustrated as embodied in a practical instrument, housed in a convenient, horizontally disposed casing having compartments. In one of the compartments is a carrier for the strip, that carrier being so moved as to progress the strip lengthwise past a slit or other aperture through which light rays may reach the strip for effecting an exposure. The strip is covered by an optical wedge which may be of either the continuous or stepped type. That wedge may be produced by any of the usual methods.

In another compartment, a light source is so positioned as to align with the slit or aperture and is preferably movable to and from the slit so that its intensity at the strip may be varied. A graduated scale is provided for indicating the various distances or intensities as the case may be.

A shutter is adapted to cover or uncover the slit when the exposure is desired, and that shutter is preferably controlled by electrical means including a solenoid and other electrical devices for opening the shutter only at a properly synchronized time relative to the movement of the strip. The electrical circuit by which the above-mentioned function is effected includes microswitches, a resistance, and a relay and will be described in detail in the following parts of the specification.

Figs. 3, 4, 5, and 6 are diagrammatic views showing progressive steps in the cycle, or different positions for the elements within the electrical circuit by means of which the shutter is controlled.

Figure 7:
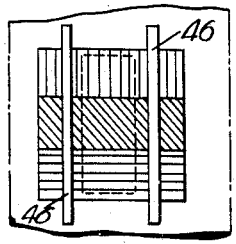

Fig. 7 is a fragmentary view of the exposure aperture or slit, especially illustrating application of colored filters thereto.

Figure 8:
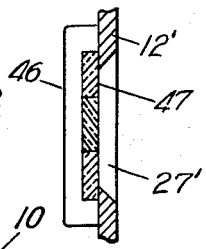

Fig. 8 is a section through Fig. 7.

Figure 9:
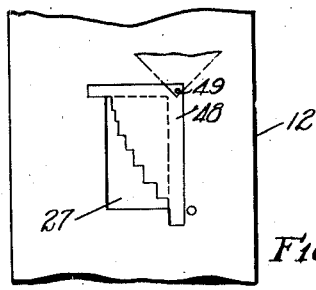

Fig. 9 is a fragmentary view of that part of the instrument adjacent the exposure aperture and showing a mask applied thereto for the purpose of effecting the production of strips modulated in accordance with both intensity and time scales.

Figure 10:
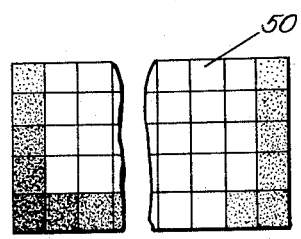

Fig. 10 is a detail view illustrating an intensity and time strip.

Figure 1:
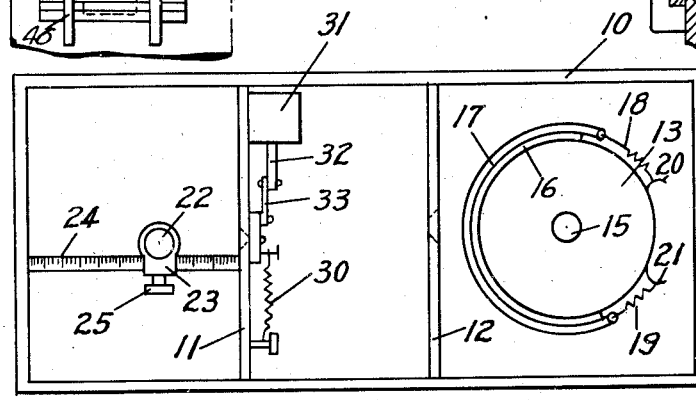
Fig. 1 is a plan view of the instrument exclusive of the electrical circuit by means of which the shutter solenoid is energized.
Figure 2:
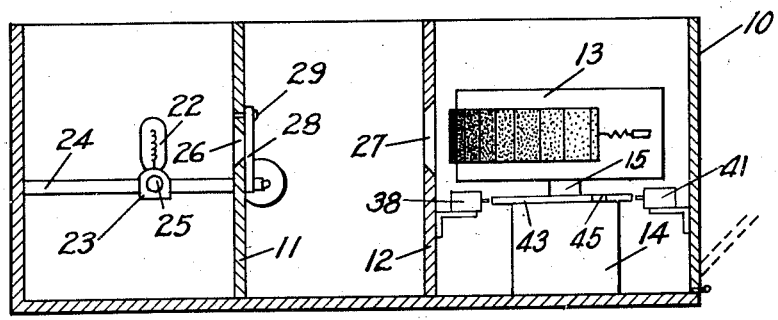
Fig. 2 is a longitudinal section through the instrument and shows the same parts illustrated in Fig. 1.

Now referring to Figs. 1 and 2, the instrument is housed within a casing 10 which is herein illustrated as opened at the top although a cover is provided, and in operation of the instrument that cover would be closed. The casing is divided into at least two compartments, but as herein illustrated, is divided into three separate sections by the walls 11 and 12. In one of the compartments, that at the right hand end, a carrier 13 in the form of a drum is rotated by a motor 14 or by any other convenient source of power. The shaft 15 extends upwardly from the motor and is fixed within the carrier or drum 13. The motor 14 is of synchronous type and is preferably similar to that used in a phonograph. Whatever source of motive power is employed, it must be of a type adapted to rotate the drum at a uniform angular speed and at a predetermined speed. In certain instances, it may be more desirable to have the motor speed controllable so that the speed at which the exposure strip is to be moved may be set at a desired figure.

A strip of sensitized material 16 is held in place at the surface of the drum in any convenient way. Preferably, and as herein shown, the strip is frictionally retained in place by a flexible, optical wedge 17. That wedge has a spring attached at at least one end adapted to connect to a hook or other projection extending outwardly from the surface of the drum. Here two springs are shown, one at either end, although a single spring may be sufficient, in which event the other end of the wedge will merely be provided for connection to the opposite hook or projection. Springs 18 and 19 connect to hooks 20 and 21, respectively. The position of the hooks 20 and 21 is such that synchronization of the travelling strip with the shutter opening is provided for. Preferably the hooks 20 and 21 are adjustable peripherally of the drum so that the position of the wedge may be more accurately determined.

While the same has not been shown, a circumferential ridge or shoulder or flange may be raised from the surface of the drum so as to position the strip and wedge, or at least the strip, vertically on the drum so as to assure its vertical alignment with the aperture through which it is exposed.

The wedge 17 may be suitably resilient, in which event it may act to grip the surface of the drum 13 and thereby retain the strip in place. In that case it may be positioned by sliding it axially on to the drum. The wedge may be stepped or of continuous type, and the actual manner in which it is fabricated is not important so long as it is so constructed as to allow exposure of the strip in suitably graduated attenuation steps.

The left hand compartment is provided with a light source consisting of a bulb 22 fixed within a holder or slide 23 and movable along a graduated bar or scale 24. The holder 23 is maintained in any desired position by locking screw 25. The graduations along the bar 24 may indicate intensity or may indicate the actual distance of the source from the surface of the strip, the emulsion of which is being exposed. In any event, the movement of the light source gives desired intensities of illumination at the exposure plane in accordance with the inverse square law and that may be directly indicated on the scale for a particular light source, or may be easily figured or selected from appropriate tables which may be prepared for different light sources. The holder 23 connects to any suitable source of electrical power such as the usual 110 volt line by an electrical cord which is not illustrated, but which is well known to those skilled in the art.

The wall 11 is provided with a slit or aperture 26 through which light rays may pass in the direction of the strip 16. In alignment with the filament of light 22 and aperture 26 is a second and larger aperture 27 cut in the wall 12 and which actually determines the cross sectional area of the light beam which strikes the emulsion of the strip. The slit 26 is large enough to allow illumination of aperture 27, and preferably, is slightly larger than required for that purpose thereby making certain that an even illumination of the aperture 27 is assured.

A shutter 28 is pivoted at 29 and is normally in a position to cover the slit 26. It is held in that position by means of a spring 30 connected at one end to a projection or other attaching means on the shutter and at its other end to a projection fixed to the wall 11. This shutter is moved against the tension of spring 30 by a solenoid 31 having a plunger or armature 32 and a connecting link 33 by which it is attached to the shutter itself. When the solenoid is energized, the shutter will be opened. At other times it remains in closed position, thereby preventing any light passing the wall 11.

The light source is preferably controlled by a suitable switch outside the casing, and it is not necessary to open the top cover of the instrument except to adjust the position of the light source and thereby vary its intensity at the exposure plane, or for inspection of the inner parts of the instrument. The end wall of the casing 10 is provided for being opened as indicated in dotted lines, Fig. 2. That allows removal of a strip and insertion of another without disturbing other parts of the instrument and with the light source illuminated, the other compartments naturally being dark since the shutter would be closed at that time.

In a simpler form of the invention, it is contemplated that only one wall may be employed and, therefore, only a single aperture with which the shutter would naturally be associated. Another modification of the mechanism provides for locating the shutter at that aperture which is adjacent the exposure plane, although it is preferable that it be located with the narrower slit and that the aperture at the exposure plane control the size of the light beam which strikes the strip.

Figure 3:
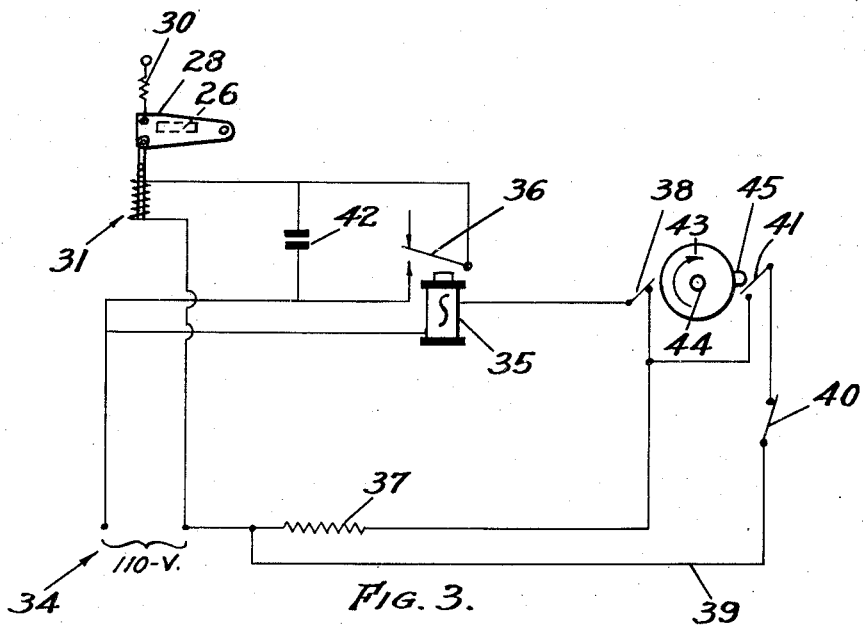

Now referring to Figs. 3–6, that circuit which is employed for controlling the opening and closing the shutter is diagrammatically illustrated in four of the positions it occupies during one cycle of operation. The shutter, aperture, spring, and solenoid are shown in Fig. 3, the solenoid being de-energized. The circuit includes wiring leading from the point 34 across which the desired voltage is impressed. That wiring leads to a relay having a magnet 35 and an armature 36. Other wiring leads through resistance 37 to a micro-switch 38 which is normally maintained in closed position. The resistance 37 is such that the current flowing through the magnet 35 cannot pull the armature 36 down, but once it has been pulled down, will retain it in that position. A shunt line indicated by numeral 39 has therein a manually operated switch 40 and a micro-switch 41, the latter normally being in open position. As can be seen from an inspection of Fig. 3, when both switches 40 and 41 are closed, current is shunted around the resistance 37, and at that time, the magnet 35 can draw the armature 36 down. It can hold it in that position after the shunt circuit is opened.

Following the wiring from point 34 up to solenoid 31, it can be seen that the solenoid is energized when armature 36 is pulled down, in other words, when the relay is actuated. At other times, the armature 31 is de-energized and spring 30 will hold the shutter in closed position. A condenser 42 prevents arcing.

Control throughout the cycle is governed by a disk 43, rotatable on shaft 44 and having thereon a cam lobe 45. The shaft 44 may be driven from some part of the mechanism which drives drum 13, or in fact, the disk 43 may be carried by shaft 15, in which event the micro-switch will be mounted nearby on some part of the motor housing. It is not important where or how the disk 44 is mounted or rotated so long as it rotates in timed relationship with drum 13 and so long as the lobe 45 bears a definite angular relationship with respect to the micro-switches and with respect to the position of the strip and wedge on the drum. Of course, the angular position of the micro-switches relatively to the center of the disk 43 is important, and preferably, there should be a range of adjustment for both the switch positions and the angular position of the disk 43 with respect to drum 13. Accurate timing may then be effected by properly positioning the various elements.

The lobe 45 closes micro-switch 41 as it passes that position and later opens switch 38 upon passing it. The switch 40 is controlled by hand and may be of push-button type or may be a knife switch.

*Operation*

Having described one preferred form which the invention may take, a description of the manner in which it operates will serve to give a clearer understanding of the mechanism and of the advantages to be gained by its employment. Assuming that the light source has been set at a desired distance from the exposure plane and that other parts of the instrument are in working order, the switch 40 being opened, it is possible to load the instrument by lowering the end wall of the casing, or if the lamp 22 is not lighted, it can be accomplished by raising the top cover. Of course, the light sensitive material must be loaded in darkness except as it is possible to handle it under illumination from appropriate safe lights.

The wedge 17 is disconnected at one end and the strip inserted in a position between the wedge and the surface of the drum, whereupon it may be clamped in that position by drawing the wedge tightly about the drum and again attaching the spring to its hook. The casing is closed, and the source of illumination turned on if that had not already been done. The motor 14 is then started whereupon drum 13 is rotated, and, of course, that rotation may continue for an indefinite period although it is merely contemplated that the rotation shall be started and continue long enough for the motor to build up speed before exposing the strip.

The first step is illustrated in Fig. 3, that is, switch 40 is closed. Nothing happens so long as the cam lobe 45 has not progressed to a point where it would contact the micro-switch 41. As soon as that contact is made and the micro-switch is closed, current is shunted around the resistance 37 and the relay operates to energize solenoid 31, thereby opening the shutter and allowing light rays to pass from the source through the apertures 26 and 27 to the exposure plane. The timing of the closing of micro-switch 41 is such that the shutter will open just prior to the approach of the leading end of the exposure strip. Switch 40 must be maintained closed until the operator hears the shutter open; then it is opened after which the operation of the sensitometer continues entirely automatically.

Figure 4:
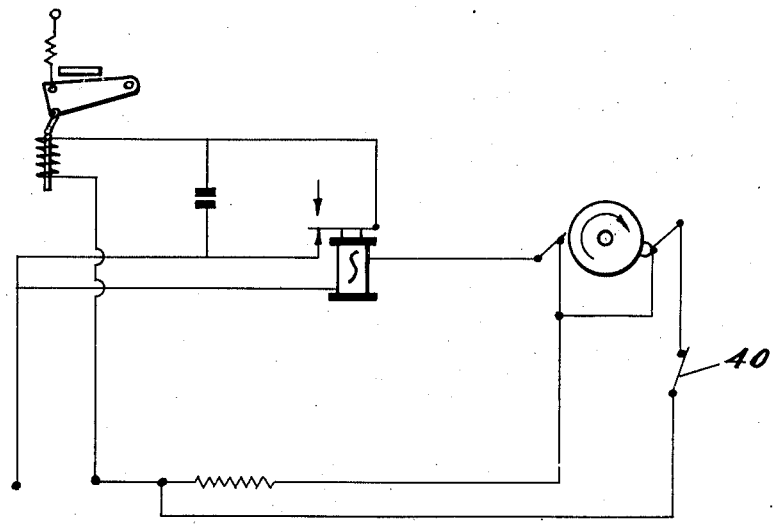
Figure 5:
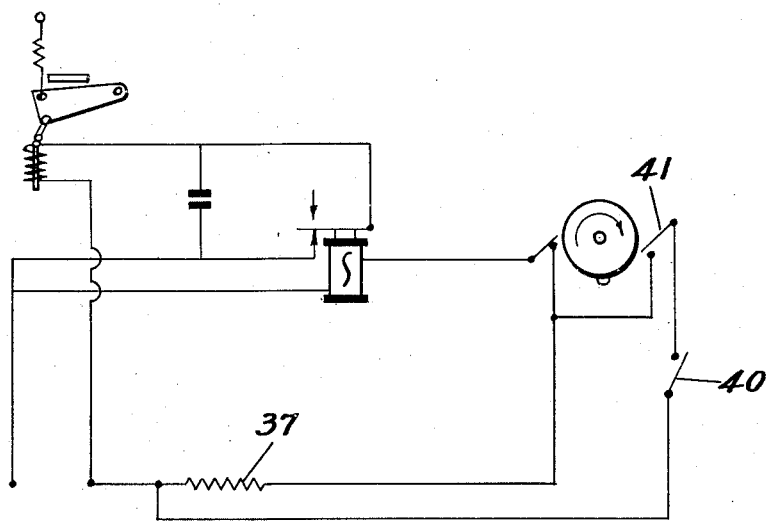

Now continuing on to Fig. 4, the position of the various parts is illustrated after the micro-switch has been closed and the shutter opened as above mentioned. In that figure, switch 40 is still closed; however, it is released shortly thereafter, and in Fig. 5 the position of the parts is again illustrated as the exposure of the strip has been partially completed. Here the strip has probably been exposed for about one-half its length according to the position of the lobe 45. In Fig. 5 switch 40 is opened, micro-switch 41 has opened after the passage of the lobe 45, but the relay still maintains solenoid 31 energized and the shutter opened since sufficient current passes resistance 37 to maintain the relay armature down once it has been initially moved to that position.

Figure 6:
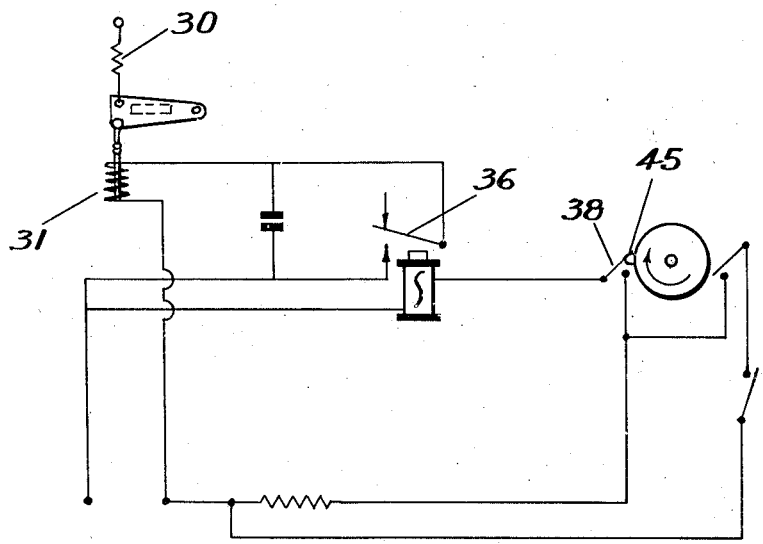

In Fig. 6 the cam lobe 45 has reached micro-switch 38 and has opened that switch, thereby breaking the circuit to the relay, releasing armature 36 so that the circuit to the solenoid is also opened allowing the shutter to close under the influence of spring 30. In this position no current is flowing in any part of the circuit, but just as soon as micro-switch 38 is released, current will flow to the relay, but can only flow through resistance 37, that being ineffective to operate the armature 36, and therefore, the shutter will remain in its closed position. The timing of the opening of micro-switch 38 occurs just after passage of the trailing edge of the strip through the light rays at the exposure plane. In fact, it could occur considerably later so long as the shutter is actually closed before the leading edge of the strip again approaches the exposure point. That assures that, despite continued rotation of the drum and strip, only one exposure shall occur and that that exposure shall be properly timed relatively to the movement of the strip through the exposure plane and past the light projected through the aperture 27.

*Modifications*

Now referring to Figs. 7 and 8, the apertured wall may be modified by providing means to retain a filter or filters. Here the wall 12' has holders or racks 46, in which filter strips may slide. Three filters 47 are illustrated, these being red, green, and blue, although any other colors may be employed that being entirely dependent upon the purpose for which they are to be used. When in that position, the filters cover the aperture 27' and the instrument may be used to produce strips which are simultaneously exposed to three or any other number of colors of light. Of course, the tri-color exposure is most common.

Referring to Fig. 9, another modification of the sensitometer involves the use of a mask 48 for covering the aperture 27' thereby to provide a time scale exposure in addition to and simultaneously with an exposure of intensity scale. This mask 48 pivots at 49 and may be swung out of position as indicated by the dot and dash lines. The mask has a series of steps which provide logarithmic modulation of the light beam which strikes the strip, such modulation being in a vertical direction or at least, in the opposite direction from the steps of the optical wedge. There may be any desired number of steps in this mask and, of course, they need not be logarithmically disposed although that is probably the preferable form which the device may take.

In Fig. 10, a strip 50, broken away at the center, shows the result of employing the sensitometer with the mask 48. In a longitudinal direction the steps or changes in intensity of exposure and thus of density, are produced by the optical wedge. In a vertical direction the modulation is a result of differences in time of exposure, both these being simultaneously effected in the production of a single strip. For simplifying the illustration, fewer steps than would normally be used have been shown. The sectioning to show density is not complete since what is illustrated here is sufficient for a thorough description of the character of the invention.

Strip 50 may be varied, and of course, the mask 48 and wedge 16 similarly changed, to give a strip which would embody continuous variation rather than the step effect herein shown. In that event a continuous wedge at the drum and a mask having a logarithmic curve rather than steps produce that desired result.

This modification dealing with exposures of the combined time and intensity scale types is especially adapted to be used when testing photographic materials for their behavior in accordance with the reciprocity law. Such studies are particularly important and heretofore have not been possible of attainment in a single strip and, therefore, by such a direct and yet exceedingly simple process.

This sensitometer is also of special advantage when testing apparatus as well as when testing photographic material such as negative material, other films or sensitized paper. One example of such use is that of testing light sources such as flash lamps, Kodatron lights, or other lights adapted to produce illumination for a particularly short period of time. By using aperture slits of about 1/1000 of an inch in width and by rotating the drum or carrier for the sensitized material at about 1,000 R. P. M., for ordinary diameters of the drum, exposure times of about 1/50,000 sec. are effected. By use of emulsions and developers, the characteristics of which are standardized and well known, the effect of these different light sources may be tested with accuracy and in the precise manner in which they are employed in practical photography. The same applies to employment of light sources of particular colors or in testing the effect of light sources which are being employed in color work and by the use of filters thereby to attain an exposure of some particular color.

While one preferred embodiment and certain modifications of the invention have been disclosed, it is to be understood that the inventive concept may be carried out in a number of ways. This application, is, therefore, not to be limited to the precise details described, but is intended to cover all variations and modifications thereof falling within the spirit of the invention and the scope of the claims.

I claim:

1. In an intensity scale sensitometer the combination of a light tight casing having compartments therein formed by opaque walls, a drum in one of said compartments and a motor for rotating said drum at a predetermined, constant speed, means for retaining a light sensitive strip at the surface of said drum including an optical wedge of flexible material having means by which both ends of said wedge are connected to the drum and by which the wedge is tensioned about the drum, a light source at the opposite compartment in said casing including a holder, a bar along which said holder is movable to and from the drum and a means of illumination carried by and moving with said holder, a slit in the wall adjacent said light source and a wider slit in the wall adjacent said drum, each being in alignment with the drum and with the light source, a shutter pivoted at the wall adjacent the light source and adapted to cover the slit in that wall, a spring for maintaining said shutter in position over the slit and a solenoid for moving said shutter against the tension of said spring to uncover the slit thereby to allow passage of light through the slit and onto light sensitive material carried by the drum.

2. In an intensity scale sensitometer the combination of a casing and walls within said casing for dividing it into three compartments, covers for the casing thereby rendering each of said compartments light tight, a motor, a shaft and a drum in one of said compartments, said drum having means for retaining a light sensitive strip in position at its surface including an optical wedge and means for connecting and tensioning said wedge about the drum, a light source in the opposite compartment and means whereby said source may be moved to and from the drum and secured in any adjusted position relatively thereto and apertures in each of said compartment walls, said apertures being in alignment with the light source and that part of the drum at which the strip is to be exposed, a shutter associated with one of said apertures having a solenoid for moving it to effect an exposure of the light sensitive material on the drum and an electrical circuit leading to said solenoid and for passing current to energize said solenoid, said circuit comprising a relay, resistance and a shunt line and switches operable in timed relationship to the rotation of the strip carrying drum for energizing the relay just before one end of said strip reaches the point of exposure at the aperture and for de-energizing the solenoid when the opposite end of said strip has passed that point.

3. In an intensity scale sensitometer the combination of a casing and at least one wall within said casing for dividing it into compartments, a drum in one of said compartments and a motor for rotating said drum at a uniform, predetermined speed, means for retaining a light sensitive strip at the surface of said drum including an optical wedge and attaching means for said wedge, a source of light in another compartment, an aperture in said wall through which a beam from said light may pass to illuminate an area of the drum at that portion at which the strip and wedge are held, a shutter for said aperture and means for actuating said shutter in synchronism with the movement of the strip and wedge past that aperture, which means includes a solenoid for moving the shutter and an electrical circuit by which current is lead to the solenoid for energizing it, said circuit having in combination a relay by means of which current may be passed through the solenoid, electrical connections leading to the relay comprising a connection having therein a resistance and a shunt line for passing current through the relay while avoiding the resistance, a manually operated switch in said shunt line and automatic switches functioning in timed relation to the movement of the drum, one for rendering effective the shunt line and another for rendering ineffective the entire circuit through the relay.

4. In a sensitometer, the combination of a casing having compartments therein formed by walls which render each of the compartments independently light tight, a carrier for a sensitized strip in one of the compartments and means for rotating that carrier at a predetermined, uniform rate of speed, a source of light in another of the compartments and apertures in the compartment walls through which a beam of light may pass from the source to the sensitized strip as it is moved by said carrier, a shutter cooperating with one of said apertures, means including an optical wedge for progressively attenuating the light beam as it progressively exposes the strip and means for masking one aperture to shorten progressively the extent of the beam in a direction along the length of travel of the carrier and strip, thereby to modulate the density of the exposed strip by exposure varying in time in addition to density modulation by intensity variation by said wedge.

5. In a sensitometer, the combination of a casing, compartments in said casing formed by walls rendering each of the compartments independently light tight, a carrier for a sensitized strip in one of the compartments and means for rotating that carrier at a predetermined uniform rate of speed, a source of light in another of the compartments and apertures in the compartment walls through which a beam of light may pass from the source of the sensitized strip as it is moved by said carrier, a shutter cooperating with one of said apertures and means for opening and closing the shutter in timed relation to the movement of the strip, and means for causing the strip to be exposed by the said light beam in such a manner that the resulting density in the exposed strip will be an indication of exposure due to both time and intensity modulation of the light, said means including an optical wedge overlying the strip and a mask for one of said apertures, said mask having logarithmic steps so disposed as to vary the length of exposure of the passing strip in a direction at right angles to its direction of movement.

6. In a sensitometer a closure having a light confining wall, a light source at one side of said wall, a slit in the wall and a shutter for covering and uncovering said slit, a carrier for a light sensitive strip having a surface for supporting a strip and an optical wedge overlying the strip and surface, and means to move said carrier, wedge and strip past a beam of light from said source through said slit, in such direction that the strip is progressively exposed in accordance with light attenuating characteristics of the wedge, and means for actuating said shutter in timed relation to movements of said carrier which includes a solenoid, a circuit for conducting current through said solenoid having therein a relay, lines leading to said relay, one of which contains a resistance such that said relay cannot be caused to function by current passing through the line and resistance, but can be maintained in current passing position, once it has been actuated, and a shunt line for conducting current around said resistance and initially actuating the relay, said shunt line including a manually operable switch and a micro-switch normally held in open position, a second micro-switch in said resistance line normally held in closed position and cam means movable in timed relation to the movement of the carrier for periodically closing the first mentioned micro-switch and opening that second mentioned.

7. In an intensity scale sensitometer, the combination of a light tight casing having compartments divided by an intermediate opaque wall, a light source in one said compartment at one side of said intermediate wall and in the other compartment at the opposite side of said wall, a rotating drum, means for rotating said drum at a predetermined uniform speed and means attached to said drum comprising an optical wedge varying in density in the direction of the circumference of said drum, said wedge and the surface of said drum having disposed therebetween a light sensitive strip extending in the direction of said wedge and substantially coextensive therewith, an aperture in said wall aligning with the said light source and the optical wedge through which a beam of light from said source may pass to the strip to expose the said strip as affected by the light attenuating characteristics of the said wedge, and a shutter for said aperture and means for opening said shutter during the rotation of said drum at a point prior to passage of one end of the wedge and strip through the light beam and for closing said shutter after the opposite end of said wedge and strip have passed the said beam.

8. In an intensity scale sensitometer, the combination of a light tight casing having compartments divided by an intermediate opaque wall, a light source in one said compartment at one side of said intermediate wall and in the other compartment at the opposite side of said wall, a rotating drum, means for rotating said drum at a predetermined uniform speed and means attached to said drum comprising an optical wedge varying in density in the direction of the circumference of said drum, said wedge and the surface of said drum having disposed therebetween a light sensitive strip extending in the direction of said wedge and substantially coextensive therewith, an aperture in said wall aligning with the said light source and the optical wedge through which a beam of light from said source may pass to the strip to expose the said strip as affected by the light attenuating characteristics of the said wedge, and a shutter for said aperture and means for opening said shutter during the rotation of said drum at a point prior to passage of one end of the wedge and strip through the light beam and for closing said shutter after the opposite end of said wedge and strip have passed the said beam, and means interposed across the beam comprising a light absorbing filter, said filter being divided into different colors laterally of the passing strip and optical wedge so that adjacent portions of the strip lengthwise of its movement shall be affected by light of selected wavelengths only.

MONROE HAMILTON SWEET.

REFERENCES CITED

The following references are of record in the file of this patent:

UNITED STATES PATENTS

| Number | Name | Date |
|---|---|---|
| 1,223,447 | Thornton | Apr. 24, 1917 |
| 1,382,272 | Davis | June 21, 1921 |
| 1,883,884 | Doran | Oct. 25, 1932 |
| 2,223,008 | Michaelis | Nov. 26, 1940 |
| 2,233,255 | Friedell | Feb. 25, 1941 |
| 2,271,572 | Rackett | Feb. 3, 1942 |

FOREIGN PATENTS

| Number | Country | Date |
|---|---|---|
| 5,628 | Great Britain | 1902 |
| 619,483 | Germany | Oct. 1, 1935 |

OTHER REFERENCES

Mees, "The Theory of the Photographic Process," published by the MacMillan Co., New York, 1942, pages 693 and 4.